July 21, 1942.   J. W. STIRTON   2,290,363
DISPENSING DEVICE
Filed Oct. 14, 1940
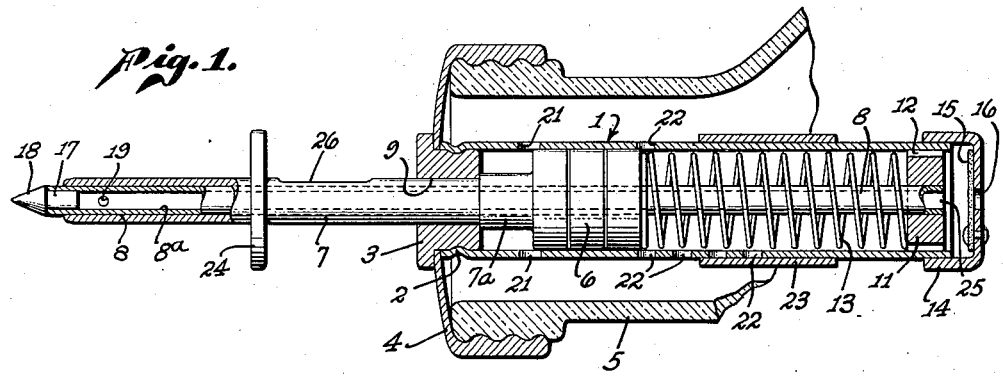
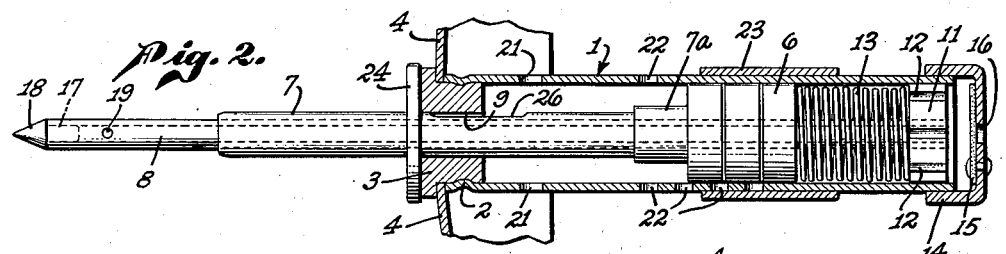
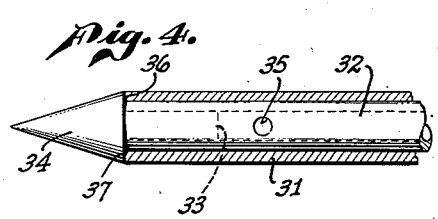
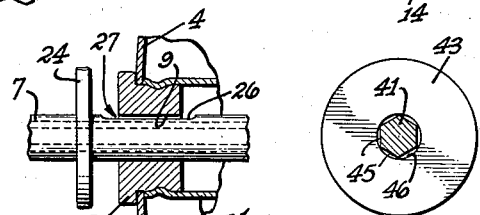
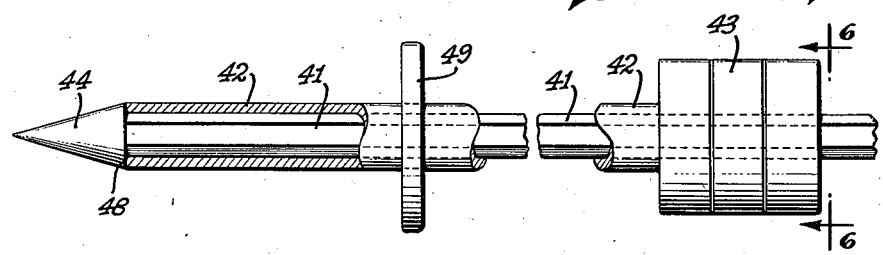
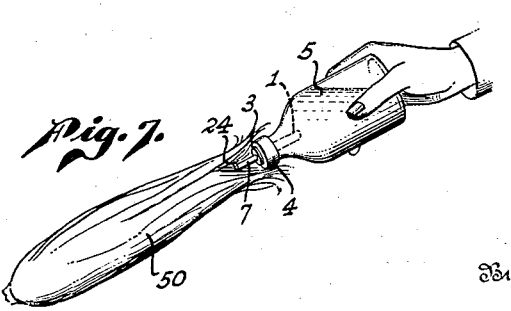
Inventor
JAMES W. STIRTON,
By Alfred W. Knight
Attorney Patented July 21, 1942

2,290,363

UNITED STATES PATENT OFFICE 2,290,363

DISPENSING DEVICE

James W. Stirton, Los Angeles, Calif.

Application October 14, 1940, Serial No. 361,099

7 Claims. (Cl. 47—57.5)

This invention relates to liquid dispensing devices.

A particular object of the invention is to provide a device for injecting liquid in measured quantities into plant parts such as corn ears, with a minimum loss of liquid and with the utmost facility.

Another object of the invention is to provide a dispensing device of the character described which may be used with various containers.

A further object of the invention is to provide a device of the character described which is simple to operate and may be inexpensively manufactured.

Another important object of the invention is to provide a device of the character described which may be transported and maintained in operating position with minimum leakage of liquid.

A further object of the invention is to provide a dispensing device with a metering adjustment which may be varied to regulate the quantity of liquid discharged.

A dispensing device according to this invention may comprise an injection or operating assembly which includes an elongated rigid and relatively fixed guide or injection member which is preferably pointed at its forward end to define an injection point. The assembly further comprises a relatively movable operating member slidably mounted on the injection member and operatively associated with displacement type pump means adapted for operative fluid communication with liquid in a container. The guide and operating members cooperate to define a liquid closure valve adjacent the outer end of the guide member and the assembly is provided with a liquid outlet passage establishing liquid communication between the pump means and the valve.

A particular feature of the invention is the provision of valve means for closing the outer end of the outlet passage except when the pump means is in operation. This prevents leakage of liquid when the device is transported. I may also provide means for varying the quantity of liquid discharged as will be described more fully in connection with the drawing.

Further objects and advantages of my invention will be specifically brought out in the ensuing description or will be apparent therefrom.

I have illustrated my invention in the accompanying drawing, and referring thereto:

Fig. 1 is a longitudinal section of my dispenser with the parts thereof shown in the relation they assume at the beginning of the dispensing operation;

Fig. 2 is another longitudinal section thereof showing the relation of the parts at the end of the dispensing operation;

Fig. 3 is a detailed sectional view of the device showing the relation of certain of the parts at an intermediate point in the dispensing operation;

Fig. 4 is a longitudinal sectional view illustrating a modified form of construction;

Fig. 5 is a longitudinal sectional view of a further modified form of construction;

Fig. 6 is a sectional elevation thereof taken on line 6—6 in Fig. 5; and

Fig. 7 is a view illustrating the operation of the device as applied to earworm control.

Referring to Figs. 1 and 2 of the drawing, a dispensing device according to this invention is shown as comprising a cylinder 1 which is attached at one end as at 2 by crimping or other suitable means to a bearing member 3 which extends through an opening in a closure member such as a screw cap 4 which is adapted to be removably attached to a suitable container such as a screw-top bottle indicated partially at 5. With the construction illustrated the cap 4 is firmly clamped between the shoulders on the bearing member 3 and the end portion of the cylinder 1.

A piston 6 is positioned within the cylinder 1 and is adapted for longitudinal sliding movement therein. The piston is attached to a tubular operating sleeve 7 which extends around a guide member 8. The operating sleeve 7 extends through an opening 9 in the bearing 3 and is adapted for longitudinal sliding movement therein. A portion 7a of the sleeve 7 next to the piston 6 is shown to be of greater diameter than the opening 9 and acts as a stop to limit the movement of the piston.

The guide member 8 extends through the sleeve 7 and piston 6 to a position adjacent the inner end of the cylinder 1 and is suitably attached to the cylinder. As an example, the member 8 is secured to a cylindrical block 11 which is secured to the inner end of the cylinder 1. The member 11 is provided with a plurality of slots 12 which provide access for fluids between the inside of the cylinder and the inner end of the guide member. A compression spring 13 is provided for biasing the piston 6 outwardly toward the closure member 4. The spring 13 is shown located within the cylinder 1 surrounding the guide member 8 and bears against one face of the piston 6 and against the member 11.

The inner end of the cylinder is provided with valve means which comprises a tight-fitting cap 14 suitably secured to the outer surface of the inner end of the cylinder and provided with a check valve in the form of a tab 15 of resilient material which is located on the face of the cap 14 within the cylinder and is adapted to open or close the opening 16 on the end of the cap according to whether or not the pressure within the cylinder is less or greater than the pressure outside of the cap.

The guide member 8 is shown in the form of a tube providing a liquid outlet passage 8a which opens at one end into the chamber formed between the cap 14 and the guide member 11. The other end of the outlet passage is shown closed by a suitable plug 17 providing a conical point 18. A discharge opening 19 is provided in the wall of the member 8 at a position adjacent the plug 17. This opening is normally closed by the operating sleeve 7 which cooperates with the member 8 to form a liquid closure valve when the operating sleeve is biased to its rest position by the spring 13 so that the dispensing device may be carried with the point 18 extending downwardly when the parts are in the position shown in Fig. 1 without loss of liquid from the container 5 through the dispensing device.

The cylinder is provided with one or more openings 21 which are located between the base 3 and the inner end of the piston 6 when it is in the position shown in Fig. 1. These openings allow fluid to flow into and out of the cylinder as the piston is moved between the positions illustrated in Figs. 1 and 2. The cylinder is further provided with a plurality of openings 22 which are located between the outer face of the piston and the member 11. A sleeve 23 of sufficient length to cover a plurality of the openings 22 is provided on the cylinder 1 and is slidable between positions in which it covers more or less of the openings 22.

The operating sleeve 7 is provided with a radially outwardly projecting portion such as an operating flange 24, which may be engaged to move the sleeve 7 and piston 6 toward the member 11 to compress the fluid contained in the cylinder 1 between the outer face of the piston 6 and the member 11. As the operating flange is moved toward the base member 3, fluids in the outer portion of the cylinder are forced through the slots 12 under pressure and the opening 16 is held closed by the tab 15. This liquid is then forced into the inner end 25 of the guide member 8 and thence through the discharge passage 8a and to the outside through the opening 19 which has been unsealed by the sleeve 7 as it is moved to the right or inwardly. The flange 24 may also be used to stop the inward movement of the operating member as shown in Fig. 2.

The piston 6 does not act to force any fluid out of the cylinder 1 until it has passed the openings 22 which are uncovered by the sleeve 23. Thus the effective length of the stroke of the piston 6 may be varied by varying the number of openings 22 covered by the sleeve 23. The position of the sleeve 23 may be calibrated in terms of the amount of fluid discharge from the opening 19.

Obviously it is necessary to provide some means for venting the interior of the container 5 to the atmosphere in order to supply air to take the place of the liquid discharged from the interior of the container. This may be done independently of the dispensing device in any well known manner as by providing a vent tube extending into the container. In general, a loose fit between the discharge member 8 and the sleeve 7 or between the sleeve 7 and the opening 9 will provide the necessary venting without appreciable loss of liquid from the container provided the dispenser is not operated rapidly for a long period of time.

As one example of a positive provision for venting in the dispensing structure itself, I may relieve a portion of the outside of the sleeve 7 as at 26. When the sleeve is in the positions shown in Figs. 1 and 2, it still makes a tight seal with the opening 9 and prevents the flow of liquid from the container therethrough. When it is in an intermediate position such as illustrated in Fig. 3, for example, the relieved portion of the sleeve provides a passage 27 for the flow of air between the sleeve and the base member 3. Although this operates to allow air to enter the container for only a short period of time, it is for all practical purposes satisfactory.

In Fig. 4 I have illustrated a modified arrangement for sealing the outlet passage when the operating sleeve is in the rest position. An operating sleeve 31 is shown extending about a tubular guide member 32 which is provided at its outer end with a plug 33 having a conical tip 34. The tubular member 32 is provided with an outlet opening 35 which is normally closed by the operating sleeve 31 and is opened when the operating sleeve is moved to force liquid through the outlet passage. With this embodiment of my invention the conical tip 34 is of greater diameter than the guide member 33 so that the outer end 36 of the operating sleeve abuts the shoulder means 37 formed by the base of the conical tip and provides valve means forming an effective liquid seal. The construction of the dispensing device may be otherwise the same as described in connection with Figs. 1 and 2.

In Figs. 1-4 the guide member is in the form of a tube and the liquid is discharged from the interior of this tube. In Figs. 5 and 6 I have illustrated a construction in which the guide member is solid and the liquid is discharged through a passage formed between the outside of the guide member and the inside of the operating sleeve. For example, a portion of the outside surface of the guide member may be made to contact the inner surface of the operating sleeve at a plurality of points to produce the desired guiding action and may be spaced from the inside of the operating member at a plurality of points to provide a liquid outlet passage. In either form the outlet passage extends through the interior of the operating member.

Referring to Figs. 5 and 6, the guide member is shown in the form of a rod 41 of polygonal cross-section which extends through a passage 46 of circular section in an operating sleeve 42 and an operating piston 43 which is connected to one end of the operating sleeve. One end of the member 41 is provided with a conical tip 44 having a base of somewhat greater diameter than the member 41, providing shoulder means 48 adapted to abut with one end of the operating sleeve to form a seal as described in connection with Fig. 4. The other end of the member 41 may be suitably secured against relative movement with respect to an operating cylinder, for example through the agency of a member such as the member 11 described in connection with Figs. 1 and 2.

The maximum diameter of the member 41 is preferably substantially the same as the inside diameter of the operating sleeve 42 so that the corners of the member 41 rest against the inside of the sleeve and the sleeve acts as a bearing to facilitate relative longitudinal movement of the two members. At the same time, the spaces between the sides 45 of the member 41 and the inside of the sleeve 42 provide outlet passages through which liquid may be discharged in the same manner as it may be discharged through the outlet passage provided by the member 8 in Fig. 1. As indicated in Fig. 6 the piston 43 is provided with an opening 46 of substantially the same size as the inside diameter of the sleeve 42 so that the desired outlet passage through the piston about the outlet member may be obtained. To facilitate operation the operating member is provided with an operating flange 49.

Although my dispensing device has many applications, it is particularly applicable to corn earworm control. In Fig. 7 I have illustrated the application of the device illustrated in Figs. 1 and 2 to such control. The same description is applicable to the modifications illustrated in Figs. 4-6. In use, the container 5 is filled with a suitable quantity of a light oil or other liquid which may contain a small percentage of pyrethrum or other agent and the screw cap 4 holding the dispensing device is screwed in place. The container 5 may be carried in inverted position if desired without undue loss of oil to an ear of corn such as illustrated at 50. The point such as the conical point 1 is pushed into the silk at the upper end of the ear, and the bottle 5 is pushed toward the ear, causing the operating sleeve to be inserted into the silk until the operating flange 24 is strongly resisted by the husk. A further movement of the bottle toward the ear causes relative movement of the operating sleeve and guide member and the discharge of liquid through the outlet opening into the corn silk. The reverse movement of the container restores the parts of the dispenser to the positions illustrated in Fig. 1, closing the outlet opening 19 and causing withdrawal of the point 1 from the ear of corn.

It should be borne in mind that the operating mechanism described herein is not necessarily limited to the precise pump construction illustrated herein, but is generally applicable to pump means which are operable by operating means such as herein described.

Having now described and illustrated particular forms of my invention, I wish it to be understood that my invention is not to be limited to the specific forms or arrangements of parts herein described and shown, except insofar as such limitations are specified in the appended claims.

I claim:

1. A device for dispensing measured quantities of liquid from a container provided with an opening, said device comprising: a closure member adapted to close such an opening; a tubular operating member movably mounted with respect to said closure member, said operating member being biased toward a rest position and being adapted for axial movement inwardly with respect to said closure member from said rest position; means defining a liquid outlet passage within said operating member and extending to a discharge position outwardly of said closure member, said outlet passage-defining means including a guide member mounted fixedly with respect to said closure member and extending axially within said operating member, said operating member when in said rest position closing said outlet passage at said discharge position and opening said outlet passage at said discharge position during said inward movement; and pump means located inwardly of said closure member in fluid communication with said outlet passage and operatively associated with said operating member, said pump means being adapted upon inward movement of said operating member to discharge liquid into said outlet passage.

2. A device as set forth in claim 1, said pump means comprising: a cylinder; a piston operatively associated with said operating member and axially movable inwardly from one position to another for discharging liquid from said cylinder, said cylinder being provided with axially spaced openings located between said last-named positions; and a sleeve mounted on said cylinder and movable between positions covering more or less of said openings, whereby respectively larger and smaller amounts of liquid may be discharged from said cylinder.

3. A device for dispensing measured quantities of liquid from a container provided with an opening, said device comprising: a closure member adapted to close such an opening; pump means located inwardly of said closure member; a tubular guide member mounted fixedly with respect to said closure member and extending outwardly therefrom, said tubular member being closed at its outer end and having a discharge opening in its wall at a position inwardly removed from its outer end, said tubular member further defining a liquid discharge passage providing fluid communication between said pump means and said opening; an operating sleeve operatively associated with said pump means, slidably mounted upon said tubular member and having a portion covering said opening when in one position, and means biasing said operating sleeve toward said one position.

4. A device for dispensing measured quantities of liquid from a container provided with an opening, said device comprising: a closure member adapted to close such an opening; a tubular operating member extending through said closure member, said operating member being biased toward a rest position and being adapted for axial movement inwardly with respect to said closure member from said rest position; a guide member mounted fixedly with respect to said closure member and extending axially within said operating member, said guide member being provided with radially outwardly extending shoulder means adjacent the outer end, a portion of the outside surface of said guide member contacting the inside surface of said operating member and another portion of said outside surface being spaced from the inside surface of said operating member to define a liquid outlet passage extending within said operating member and without said guide member from a position inwardly of said closure member to said shoulder means, said operating member when in said rest position cooperating with said shoulder means to close said outlet passage and opening said passage when moved inwardly; and pump means located inwardly of said closure member and carried thereby in operative association with said operating said operating member to discharge liquid into said outlet passage.

5. A device for dispensing a liquid from a container provided with an opening, said device comprising: a closure member adapted to close such an opening; a tubular operating member movably mounted with respect to said closure member, said operating member being biased toward a rest position and being adapted for axial movement inwardly with respect to said closure member from said rest position; means defining a liquid outlet passage within said operating member extending to a discharge position outwardly of said closure member, said outlet passage-defining means including a guide member associated with said closure member and extending axially within said operating member, said operating member when in said rest position closing said outlet passage at said discharge position and opening said outlet passage at said discharge position during said inward movement; and pump means positioned to receive liquid from the container and in operative association with said operating member, said pump means being in fluid communication with said outlet passage at a position inwardly removed from said discharge position and being adapted upon inward movement of said operating member to discharge liquid into said outlet passage.

6. A device for dispensing liquid from a container provided with an opening, said device comprising: a closure member adapted to close such an opening; a tubular operating member movably mounted with respect to said closure member said operating member being biased toward a rest position and being adapted for axial movement inwardly with respect to said closure member from said rest position; a guide member associated with said closure member and extending axially within said operating member, said guide member being provided with radially outwardly extending shoulder means adjacent the outer end, a portion of the outside surface of said guide member contacting the inner surface of said operating member and another portion of said outside surface being spaced from said inner surface to define a liquid outlet passage extending within said operating member outwardly to said shoulder means, said operating member when in said rest position cooperating with said shoulder means to close said outlet passage and opening said passage when moved inwardly; and pump means positioned to receive liquid from said container and in operative association with said operating member, said pump means being in fluid communication with said outlet passage at a position inwardly removed from said shoulder means and being adapted upon inward movement of said operating member to discharge liquid into said outlet passage.

7. A device for dispensing liquid from a container, comprising: pump means including a cylinder adapted to receive liquid from the container and piston means mounted for reciprocatory movement in said cylinder; a tubular operating member operatively associated with said piston means, said operating member being biased toward a rest position and being adapted for axial movement inwardly with respect to said cylinder from said rest position; means defining an elongated outlet passage communicating at one end with said cylinder and having a discharge portion at its other end, said means including a guide member extending parallel to the direction of movement of said operating member and slidably mounted therein; and cooperating valve means on said operating member and said last-named means positioned to close said outlet passage at a position adjacent said discharge portion when said operating member is in said rest position, said operating member being adapted to open said passage at said discharge portion and move said piston means inwardly to cause discharge of liquid from said cylinder outwardly through said discharge passage upon movement inwardly from said rest position.

JAMES W. STIRTON.